United States Patent [19]
Urbain

[11] Patent Number: 5,990,892
[45] Date of Patent: Nov. 23, 1999

[54] ADMINISTRATIVE INTERFACE FOR A DATABASE IN A DISTRIBUTED COMPUTER ENVIRONMENT

[75] Inventor: François Urbain, Paris, France

[73] Assignee: Bull, S.A., Louveciennes, France

[21] Appl. No.: 08/860,086

[22] PCT Filed: Oct. 31, 1996

[86] PCT No.: PCT/FR96/01710

§ 371 Date: Oct. 8, 1997

§ 102(e) Date: Oct. 8, 1997

[87] PCT Pub. No.: WO97/17660

PCT Pub. Date: May 15, 1997

[30] Foreign Application Priority Data

Nov. 3, 1995 [FR] France ................................. 95 12992

[51] Int. Cl.$^6$ ................................................. G06F 15/00
[52] U.S. Cl. ........................... 345/356; 345/357; 706/61; 395/406; 395/653
[58] Field of Search ................................. 345/326, 356, 345/357; 706/61; 395/406, 653, 712

[56] References Cited

U.S. PATENT DOCUMENTS 5,193,152   3/1993   Smith ......................................... 395/200
5,712,960   1/1998   Chiopris et al. ........................... 706/61
5,774,689   6/1998   Curtis et al. .............................. 395/500
5,848,243  12/1998   Kulkarni et al. .................... 395/200.54

FOREIGN PATENT DOCUMENTS 0490624   6/1992   European Pat. Off. .
0673135   9/1995   European Pat. Off. .

OTHER PUBLICATIONS

Hewlett–Packard Journal, vol. 41, No. 2, Apr. 1, 1990, pp. 60–65, XP000116175, Smith C. J. et al.: "HP Open View Windows: A User Interface For Network Management Solutions".

Primary Examiner—Ba Huynh
Attorney, Agent, or Firm—Kerkam, Stowell, Kondracki & Clarke, P.C.; Edward J. Kondracki

[57] ABSTRACT

An administrator interface working with a relational data base management system belonging to a distributed data processing environment including a plurality of folders which reflect the states of the network and objects in the network, relative to the management (120), the processes (121) in the course of running, the events (122) which affect the processes (121), the configuration (123), the files (124), the command scripts (125), and the errors (126), and a software program for allowing access to and/or manipulation of the folders.

22 Claims, 7 Drawing Sheets

FIG 1

NODE — 21

- OPERATING SYSTEM: — 22
- NAME OF THE NODE: — 23
- RELEASE: — 24
- VERSION: — 25
- MACHINE ID: — 26
- OK — 27

SQL SERVER — 31

- ORACLE RELEASE: — 32
- STARTED AT: — 33
- LAST CONNECTION: — 34
- TOTAL CONNECTION: — 35
- TOTAL REJECTIONS: — 36
- ACTIVE SUBPROCESSES: — 37
- LENGTH OF QUEUE: — 38
- OK — 39

```
                    ┌─ 41
┌──────────────────────────────┐
│ □    INSTANCE         □  □  │
├──────────────────────────────┤
│ RELEASE:         [    ]─ 42 │
│ SQL RELEASE:     [     ]─ 43│
│ TOTAL SYSTEM                 │         ← 40
│ GLOBAL AREA:     [     ]─ 44│
│ FIXED SIZE:      [     ]─441│
│ VARIABLE SIZE:   [     ]─442│
│ DATABASE BUFFER SIZE: [  ]─443│
│ REDO BUFFER SIZE:     [  ]─444│
│ PASSWORD:        [    ]─ 45 │
│ REMOTE ROLES:    [    ]─ 46 │
│              [OK]─ 47        │
└──────────────────────────────┘
```

FIG 4

```
                                  ┌─ 51
┌────────────────────────────────────┐
│ □      MANAGEMENT            □  □ │
├────────────────────────────────────┤
│ NODE:       [    ]─ 52            │
│ INSTANCE:   [      ]─ 53          │          ← 50
│ ORACLE PATH: [    ]─ 54           │
│ SQL STRING:  [    ]─ 55           │
│ ADMINISTRATIVE                    │
│ UNIX USER:          [    ]─ 56    │
│ ADMINISTRATIVE                    │
│ ORACLE USER:        [    ]─ 57    │
│ PASSWORD:    [      ]─ 58         │
│ ┌─────────────────────────────┐   │
│ │ NODE  INSTANCE ORACLE PATH SQL STRING │
│ │  ┊501    ┊502     ┊503      ┊504   │─ 59
│ [ADD]   [DELETE]  [MODIFY]   [QUIT]│
└────────────────────────────────────┘
```

ADMINISTRATIVE INTERFACE FOR A DATABASE IN A DISTRIBUTED COMPUTER ENVIRONMENT

BACKGROUND OF THE INVENTION

1. Field of the Invention

The present invention relates to an administrator interface for a data base in a distributed data processing environment. It applies in particular to the supervision of the operation of a data base and to the detection of potential abnormal operations.

2. Description of Related Art

The current trend in the development of data processing systems is to form such a system by associating a plurality of machines or platforms connected to one another by means of a network, (LAN) for example a local area network. In the LAN, any user can run applications of extremely varied types on this group of machines. These applications call services which supply information required to handle the problem or problems they are working on, which are offered by all or some of these machines. A system of this type is called, in the most general designation a "distributed data processing environment", which one skilled in the art usually called a "site".

Each machine or platform is also called a "node" by one skilled in the art, and any process running on any of these machines is designated by the server name, and thus executes a given job on the server.

A data base may be defined as being an integrated data set which models a given environment. The data used by various applications is collected in the same base in order to avoid the problem of their duplication. A conceptual schema associated with a data base describes the structure and the type of data it contains and the constraints which must always be satisfied, the latter function being fulfilled by the data base administrator.

The structure of a data base is composed of a set of files which constitute the physical data storage medium. Three types of files are distinguished. The Data files ensure the storage of the objects created by the users of the base as well as those necessary to the operation of the base. The Redo Log files contain the most recent modifications of the data; they are used to return the data base to a consistent state, without losing the unsaved updates in the data files in case of a hardware or software failure. The Control files contain the information related to the structure of the data base, such as the name of the data base, the name and location of the Data files and Redo Log files, etc., and are updated each time a Data file or Redo Log file is created or renamed.

One of the most widely used data base management systems is the Relational Data Base Management System, often designated by its acronym RDBMS, known under the registered trademark ORACLE V7, produced by the company ORACLE Corp., which uses the standardized language SQL (Structured Query Language) and operates on a machine running the UNIX (trademark registered to Norrell, Inc.) operating system, the communication protocol used being the standardized protocol SQL*NET.

The internal architecture of ORACLE is organized into three levels. A first level, called a file level, corresponds to the structure of the data base and to the way in which the data is stored. A second level, called a storage level, corresponds to the organization of data in main storage; it is composed of a set of buffer areas allocated by ORACLE for containing the data and certain control information. Finally, a third level, called a process level, corresponds to the various Oracle processes which ensure the management of the data (as distinguished from the user-provided processes which ensure the execution of the applications submitted to ORACLE, and the DBMS processes which ensure the management of the data, for example data writing, checkpoint data writing, copying into archive files, etc.). A process is a mechanism of the operating system which makes it possible to execute a series of calculation and input/output operations. The role of the various ORACLE processes is to execute the actions entered by the applications and to exchange the data between auxiliary storage and main storage. The combination of the allocated storage areas and the processes constitutes an ORACLE instance. The latter can also be defined as a set of servers and associated storage spaces which ensures the access to and the integrity of the ORACLE data base. The machines and software programs which run on them and which operate with the ORACLE system are called objects.

Within the scope of the invention, it is assumed that this data base is used in a distributed data processing environment.

In terms of satisfying the constraints mentioned above, the management of the data has three roles of an organizational and technical order. First, it defines the users of the data base, giving each of them a name, a password and a set of privileges or rights to access the data. It also defines the administrator or administrators, who are the authorized persons responsible for it, either in part or in its entirety. Its second role is to assign the definition of the conceptual schema of this base to the administrator, or to have the administrator participate in its definition. The administrator therefore defines the schemas of the various tables and the rules related to these tables.

SUMMARY OF THE INVENTION

The object of the present invention is to provide an aid for the administrator which sees to the proper utilization of the data base and thus to the proper operation of its management system. It is particularly well adapted to the ORACLE system defined above.

The object of the invention is to offer a user-friendly administrator interface which allows the administrator to gain easy access to the current status of the objects in the base, as well as access to information related to each of these objects. Thus, the administrator is relieved of the work of performing a search on the current status of the base on the one hand, and of compiling the results of such a search on the other hand.

Thus, the invention relates to an administrator interface which works, by means of a graphical user interface, with a relational data base management system belonging to a distributed data processing environment comprising a plurality of machines connected to a network, and is characterized in that it comprises:

a plurality of folders which reflect the states of the network on the one hand and objects in this network on the other hand, at least relative to the Management, the Processes in the course of running, the Events which affect them, the Configuration, the Files, the command scripts also known as Scripts, and the Errors, this plurality comprising at least:

for each of the instances, a list of instance references attached to the nodes of the network, a list of process references and a list of event and trace file references, a list of parameters, lists of file references, a list of scripts, and means for allowing access to and/or manipulation of the folders.

According to another characteristic, the means are constituted by a window which makes it possible, by means of a menu bar, to select one of the folders in order to make a corresponding pane appear.

BRIEF DESCRIPTION OF THE DRAWINGS

The characteristics and advantages of the invention will emerge from the following description, given by way of example and illustrated in the appended drawings, in which FIGS. 1 through 14 represent the various windows and panes used by the administrator interface of the data base.

DESCRIPTION OF THE PREFERRED EMBODIMENTS

As indicated above, the interface according to the invention preferably works with the ORACLE type of relational data base management system, more commonly designated by its acronym RDBMS.

In the exemplary embodiment described herein, the interface comprises seven folders which can be accessed and/or manipulated through it. The content of these is indicated below; they are the Management, Processes, Events, Configuration, Files, Scripts, and Errors folders.

This interface also includes a software program for the presentation and constitution of the folders. This software is connected by a link of the terminal to a mouse which makes it possible to cause external events. The mouse is, for example, the type with three buttons. The external events caused by the mouse are processed by a pre-programmed mouse interface incorporated into the software which can also recognize the pressing or release of a button, the dragging of the mouse, and logical events such as the entry of the pointer into a window or a field. On the screen, the position of the pointer of the mouse is indicated by a small arrow directed upward. Of course, without leaving the scope of the invention, the mouse could be replaced by any other pointing device such as a light pen or a graphic plotter. Finally, in addition to the mouse interface, an interface is also provided for a programmed keyboard, for the character keys as well as for the command keys and arrow keys, so that it is possible, in the edit mode, to enter the information which corresponds to different areas of different windows. The presentation software allows the display of the windows and the execution of actions selected on control buttons of a window as a result of the triggering of an external event, such as for example the operation of a mouse button. In the text which follows, it is implied that any selection operation will be effected by means of the mouse.

The display of the windows occurs through a graphical interface of the X/Motif (registered trademark) type.

Figure 1:
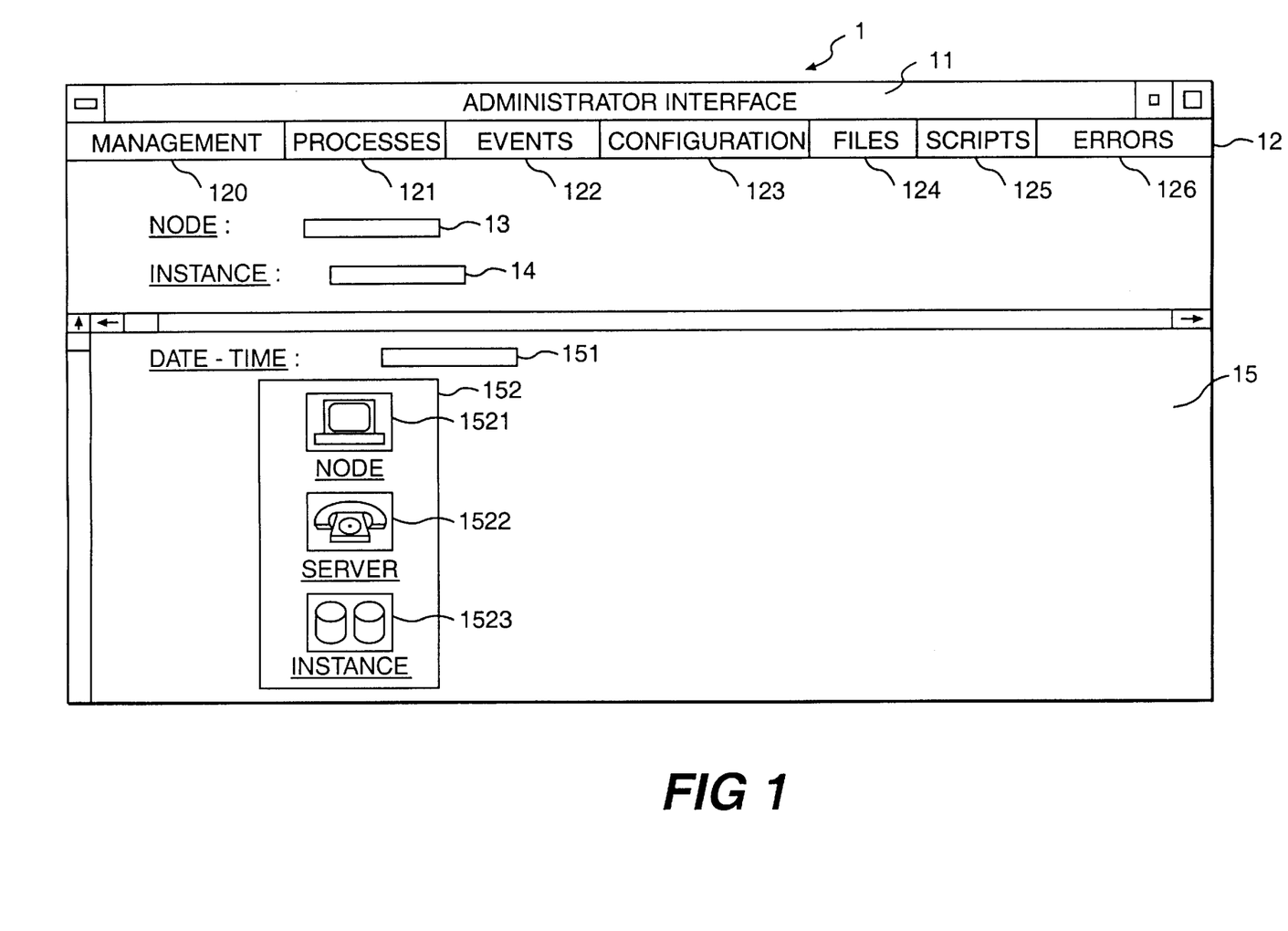
FIG. 1 illustrates an Administrator Interface screen.

The first window displayed, or the main window, after the connection with the server in the process of running in a given node is the window 1 (FIG. 1).

This window 1 includes a title bar 11, underneath which is a menu bar 12 that makes it possible to select one of the folders contained in the menu, namely Management 120, Processes 121, Events 122, Configuration 123, Files 124, Scripts 125 and Errors 126, the menu comprising a control button associated with each folder. Each of the folders makes it possible, by selecting it, to display another window.

The window 1 presents the state of the network by giving a current view of the following ORACLE objects: declared nodes in the network, state of the SQL server of each node, and declared instances in each node.

The window 1 includes a first field 13 which allows the display of a node name (Node), a second field 14 which allows the display of an instance name (Instance), and a box 15 with horizontal and vertical scroll bars. The box 15 includes a field 151 which indicates the current time references (Time).

In the box 15, each node in the distributed data processing environment (which one skilled in the art usually calls a "site", a term which will be used throughout the text which follows), is represented by a vertical rectangle 152. Each rectangle 152 includes an icon 1521 indicating the name of the node, an icon 1522 representing the state of the SQL server connected to the node, and possibly one or more icons 1523 indicating the possible instance or instances declared in this node.

To facilitate the understanding of the site by the administrator, the rectangle 152 will preferably be of a different color depending on whether or not the node is effectively connected to the network. Likewise, the icon representing the state of the corresponding server will be of a different color and/or have a different graphic depending on whether or not this server is accessible. Likewise, the icon or icons representing the corresponding instance or instances declared in the node, for example, will be of different colors depending on whether or not these instances are active.

By selecting an icon 1521 representing a node (for example, by pressing the middle button on the mouse when the mouse pointer is positioned over the icon), a pane 20 (illustrated in FIG. 2) is created in which basic information related to the selected node is displayed. At the same time, the name of the node is displayed in the field 13.

Figure 2:
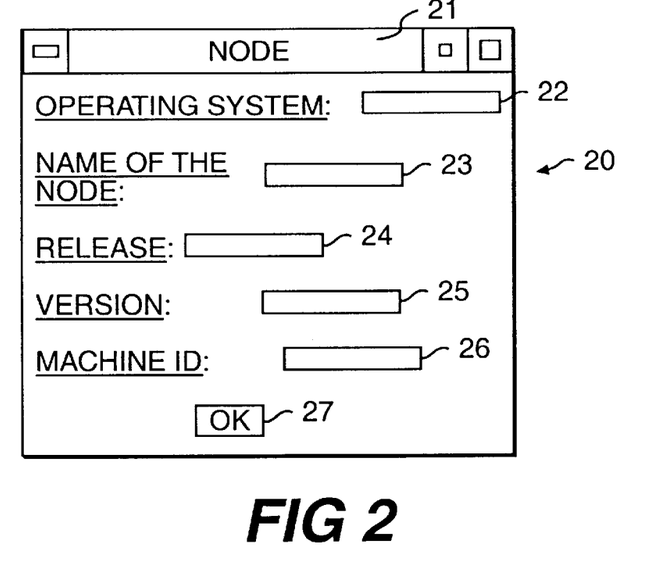
FIG. 2 illustrates a Node information screen.

The pane 20 includes a title bar 21, a first field 22 indicating the name of the operating system (OS) used, a second field (23) indicating the name (Name) of the node in the network, a third field 24 indicating the release (Release) of the operating system, and possibly a fourth field 25 indicating the reference number (Version) of a version of the operating system, a fifth field 26 indicating the network address (machine ID) of the machine corresponding to the node, and a control button 27 (OK) which makes it possible to close the pane 20 (for example by pressing the middle button of the mouse, the mouse pointer being positioned over the button) and return to the main window 1.

By selecting an icon 1522 representing the SQL server running in a given node (for example by pressing the middle button of the mouse when the mouse pointer is positioned over the icon), a pane 30 (illustrated in FIG. 3) is created in which basic information related to the selected server is displayed. Simultaneously, the name of the node to which the server is connected is displayed in the field 13, in the case where this information was not displayed previously.

Figure 3:
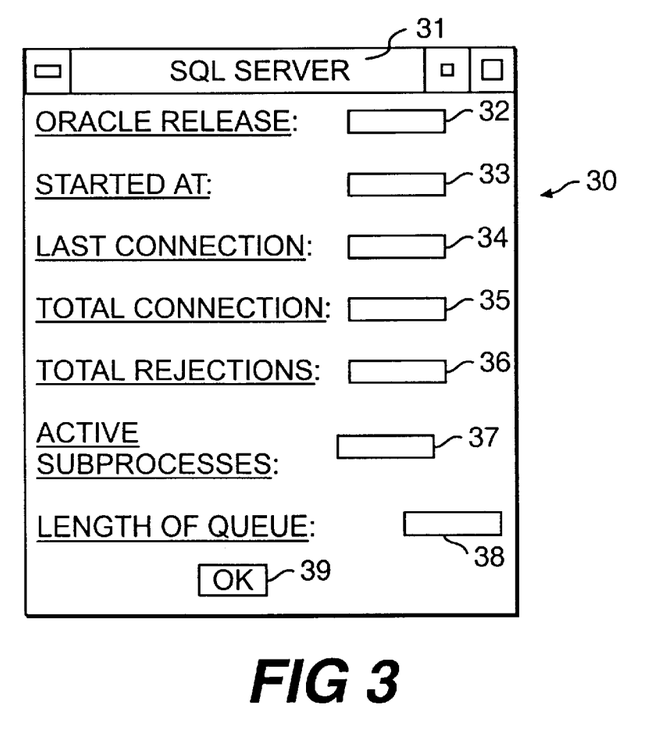
FIG. 3 illustrates an SQL Server information screen.

The pane 30 includes a title bar 31, a first field 32 indicating the reference number (Release) of the current ORACLE release, a second field 33 indicating the startup date (Started at) of the SQL server in the network, a third field 34 indicating the date (Last connection) of the last connection of the server to the network, a fourth field 35 indicating the total number of accepted connections (Total connections) of the server to the network, a fifth field 36 indicating the total number of rejected connections (Total rejections) of the server to the network, a sixth field 37 indicating the number of active subprocesses of the server (these are the subprocesses created for processing the requests submitted by user-provided processes connected to an instance, a user-provided process being responsible for the running of an application or an Oracle tool), a seventh field 38 indicating the length of the queue (Length of queue) of requests submitted to this server by users connected to the network, and a control button 39 (OK) which makes it possible to close the pane 30 (for example by pressing the middle button of the mouse, the mouse pointer being positioned over the button) and return to the main menu.

By selecting an icon 1523 representing an instance attached to a node (for example by pressing the middle button of the mouse when the mouse pointer is positioned over the icon), a pane 40 (illustrated in FIG. 4) is created in which basic information related to the selected instance is displayed. Simultaneously, the name of the node is displayed in the field 13 (if this has not already occurred), and the name of the instance is displayed in the field 16.

Figure 4:
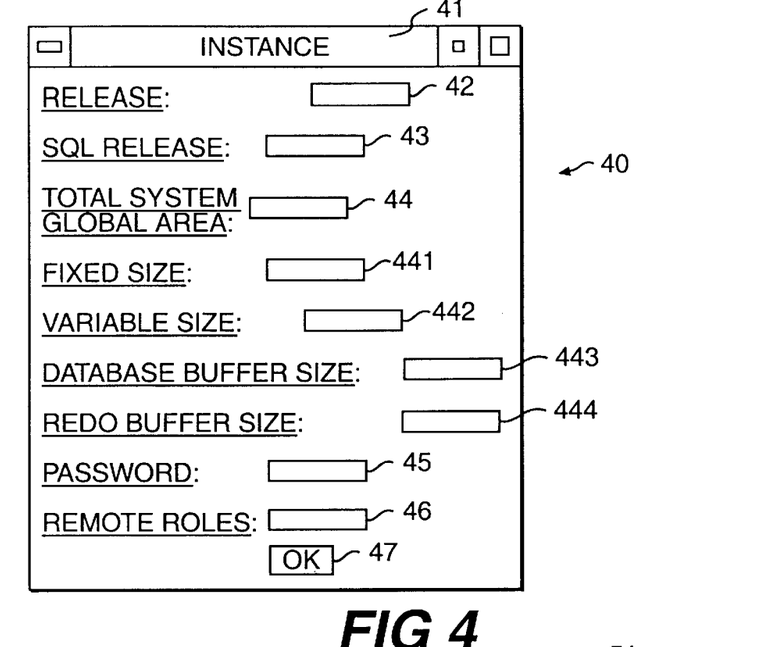
FIG. 4 illustrates an Instance information screen displaying basic information relating to the selected instance.

The pane 40 includes a title bar 41, a first field 42 indicating the reference number (Release) of the release of the instance, a second field 43 indicating the reference number (SQL release) of the current SQL release, a third field 44 indicating the size (Total System Global Area) of the system global area in octets (the system global area is a set of shared buffer areas which contain the data and control information related to an ORACLE instance shared among several users connected to it), also called SGA (System Global Area), a fourth field 441 indicating the fixed size (Fixed Size) of the system global area, a fifth field 442 indicating the variable size (Variable Size) of the system global area, a sixth field 443 indicating the size of the database buffers (Database Buffers) of the system global area, a seventh field 444 indicating the size of the redo buffers (Redo Buffers) of the system global area, an eighth field 45 indicating the reference (remote_login_passwordfile) of the file containing the password for connecting to the instance from a remote site, a ninth field 46 indicating the value of a parameter (remote_os_roles) which indicates the existence of roles related to the remote connection via the operating system, and a control button 47 (OK) which makes it possible to close the pane 40 (for example by pressing the middle button of the mouse, the mouse pointer being positioned over the button) and return to the main menu.

A role is an aggregation of data access rights and system privileges which increases security and significantly reduces the difficulty and the cost of administrating it, which aggregation can be allocated to users and/or to other roles. Generally, the application roles, which include all the privileges required to run an application, are distinguished from the user roles, which manage the common privileges required for the users of the base, such as login privileges.

By selecting the Management folder 120, (for example by pressing on the middle button of the mouse, the mouse pointer being positioned over the button corresponding to the folder), a pane 50 (illustrated in FIG. 5) is created in which the administrator can control the list of the instances managed by the interface (that is, those displayed in the box 15). The user can add, modify, or delete an instance from the list.

Figure 5:
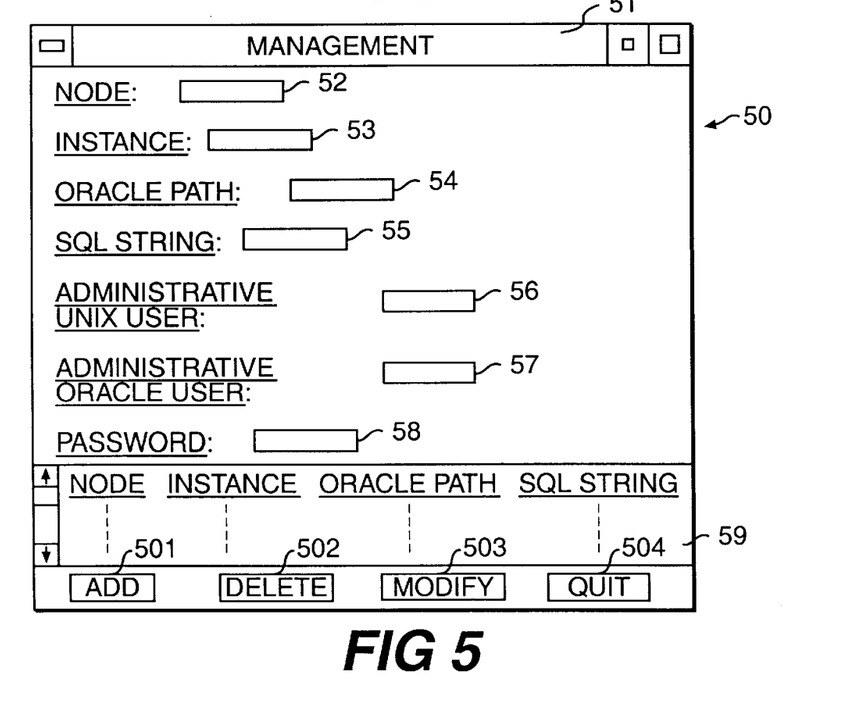
FIG. 5 illustrates a Management screen for controlling a list of instances managed by the interface.

The pane 50 includes a title bar 51, a first field 52 indicating or making it possible to indicate in a text editing box the name of a node (Node), a second field 53 indicating or making it possible indicate in a text editing box the name of an instance (Instance) attached to the node indicated in the field 52, a third field 54 indicating or making it possible to indicate in a text editing box the path of this instance (environment value Oracle_Home), a fourth field 55 indicating or making it possible to indicate in a text editing box the SQL communication string (SQL Index String) which makes it possible to connect to the instance from another node (a STRING is an Oracle data type: a string ending in a null value), if this possibility is available in the network, a fifth field 56 indicating or making it possible to indicate in a text editing box the name of the UNIX administrator (Administrative UNIX User) for this instance, a sixth field 57 indicating or making it possible to indicate in a text editing box the name of the ORACLE administrator (Administrative oracle User) for this instance, a seventh field 58 indicating or making it possible to indicate in a text editing box the password (Password) of the ORACLE administrator to whom the instance belongs, a box 59 with a vertical scroll bar which presents and allows the selection of the instances having been entered by the administrator (for example by displaying, for each instance, a line indicating the node in which they are running, their name, their ORACLE path and their associated SQL index string), a first control button 501 (ADD) which makes it possible to validate an addition of an instance, a second control button 502 (DELETE) which makes it possible to delete one of the instances present in the box 59, a third control button 503 (MODIFY) which makes it possible to modify the values related to one of the instances present in the box 59, and a fourth control button 504 (QUIT) which makes it possible to leave the pane 50.

In order to add an instance to the list of instances managed by the interface, the administrator will fill in the fields 52 through 58 with the information corresponding to this instance, and select the button "ADD". It is possible to provide for a series of checks to be carried out in order to ensure that the input data is valid, for example by initiating an access to the node indicated in the field 52 by performing a check of the access rights for executing remote commands of the shell type (shell is a command language in the UNIX world) (if the rights are not defined, the user can be given the ability to define them by means of an xterm session (a known session of the X/Motif interface) under the name of the user entered; the user must then modify the file $HOME/.rhosts (a UNIX world file) during the xterm session by adding a line with the name of the node in which ORACLE is running and the name of the user under whose name it is running, and finally to check the access to the instance under the name and the password entered. If the connection has not been made, the corresponding ORACLE error is returned. In the opposite case, a new line is inserted in the box 59. Simultaneously, an icon 1523 is created in the box 15.

To delete or modify an instance indicated in the box 59, the line corresponding to this instance is selected, for example by clicking twice on the left button of the mouse, the mouse pointer being positioned over the line. The fields 52 through 59 then display the information related to the instance selected. If the "DELETE" button is selected, the line is deleted in the box 59. If the "MODIFY" button is selected, the values can be modified in the same way they were created.

The pane 50 is exited by selecting the "QUIT" button.

By selecting the Processes folder 121, a pane 60 (illustrated in FIG. 6) is created in which the administrator has access to a view of the current state of the processes related to a given instance of a given node. The selection of the object Processes must be preceded by the selection of an instance appearing in the box 15.

Figure 6:
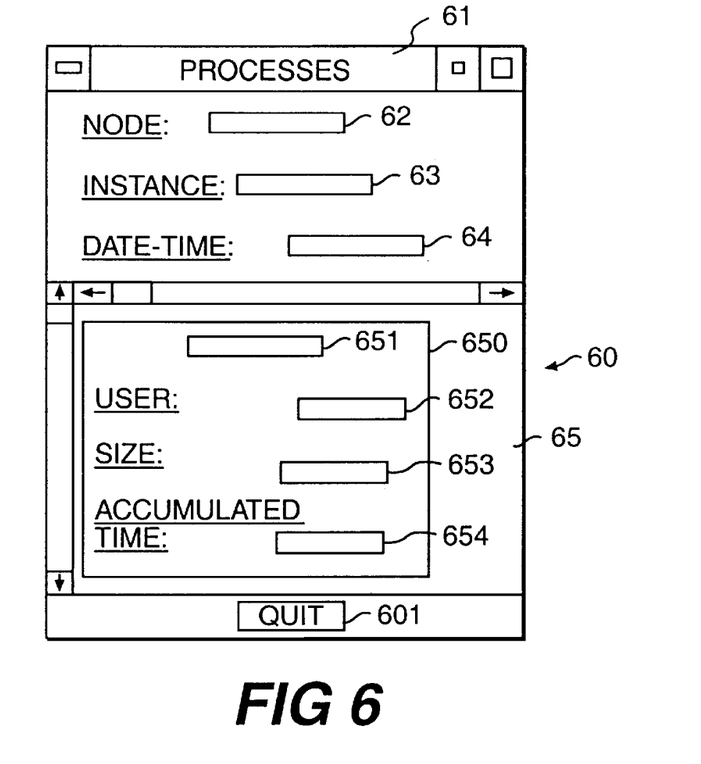
FIG. 6 illustrates information on the processes related to the instance.

The pane 60 includes a title bar 61, a first field 62 indicating the name of a node (Node), a second field 63 indicating the name of an instance (Instance), a third field 64 indicating the current time references (Time, for example the current day, date and time), a box 65 with vertical and horizontal scroll bars which presents information on the processes related to the instance (for example by displaying a square 650 for each process which includes a first field 651 indicating the name of the process), a second field 652 indicating the name of the user (User) to whom the process belongs, a third field 653 indicating the size (Size) of the process in page frames, and a fourth field 654 indicating the accumulated execution time of the process in the central processor (CPU) in minutes and seconds, and a control button 601 (QUIT) which makes it possible to leave the pane 60.

It is particularly important to know the accumulated execution time of a process, which makes it possible to detect whether a process has been running too long, that is, whether it is monopolizing the resources of the machine on which it is running to the detriment of the other processes.

By selecting the Events folder 122 by means of the mouse, a pane 70 (illustrated in FIG. 7) is created in which the administrator has access to a state of the most recent events (Events) and to a list of the log files (Logfiles) related to the events, for a given instance and a given node. The selection of the object Events must be preceded by the selection of an instance appearing in the box 15.

Figure 7:
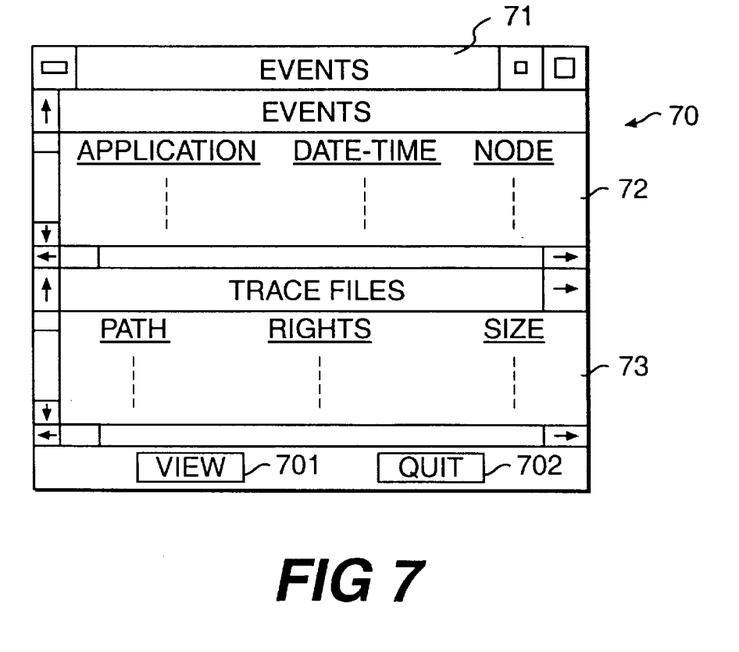
FIG. 7 illustrates an Events screen displaying information relating to the most recent events.

The pane 70 includes a title bar 71, a first box 72 with horizontal and vertical scroll bars presenting information on the most recent events related to the instance (for example by displaying one line per event which indicates the application involved, the time references of the event, the name of the node involved, a message related to the event—for example an error message if the event involves an abnormal operation—the name of the instance in question, and the references of the trace file related to the event), a second box 73 with horizontal and vertical scroll bars presenting information on the trace files related to the events (for example by displaying one line per trace file indicating the path of the file, the rights relative to the file, the size of the file), a first control button 701 (VIEW) which makes it possible to edit contents the of the files in a xterm session by means of the mouse, and a second control button 702 (QUIT) which makes it possible to leave the pane 70.

Access to the contents of the trace files is gained, for example by opening an xterm session, by clicking twice on the left button of the mouse, the mouse pointer being positioned over the line of the box 73 describing the file, or by selecting this line by clicking on this button and selecting the "VIEW" button.

By selecting the Configuration folder 123, a pane 80 (illustrated in FIG. 8) is created in which the administrator has access to a list of parameters related to an instance. The selection of the object Configuration must be preceded by the selection of an instance appearing in the box 15.

Figure 8:
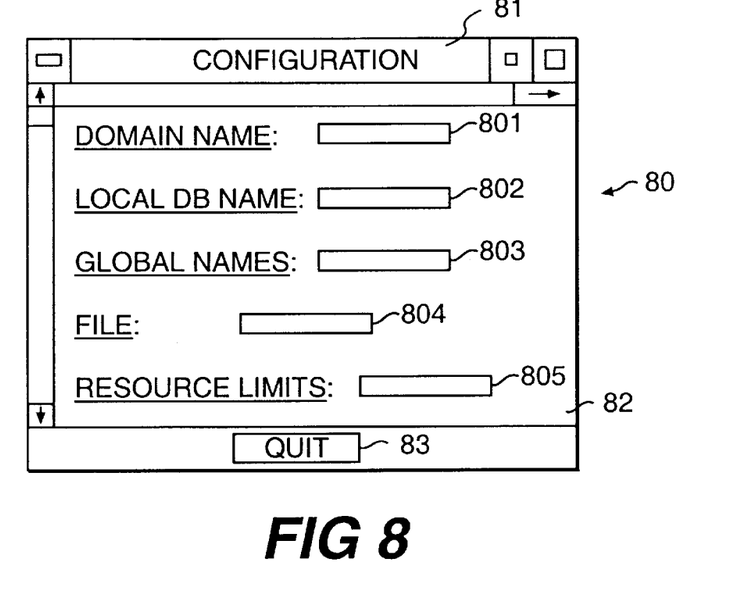
FIG. 8 illustrates a Configuration screen displaying a list of fields related to parameters of the instance.

The pane 80 includes a title bar 81, a box 82 with horizontal and vertical scroll bars presenting a list of fields related to parameters of the instance (for example identification parameters, characteristic parameters, parameters specific to the operating systems or to the network), and a control button 83 (QUIT) which makes it possible to leave the pane 80.

A set of parameters associated with the ORACLE instance will be displayed, and the user can choose these parameters from among those provided by the ORACLE SQL request called "Showparameters".

By selecting the Files folder 124, a pane 90 (illustrated in FIG. 9) is created in which the administrator has access to the names and locations of files related to the instances, and to their contents if they are text files. The selection of the object Files must be preceded by the selection of an instance appearing in the box 15.

Figure 9:
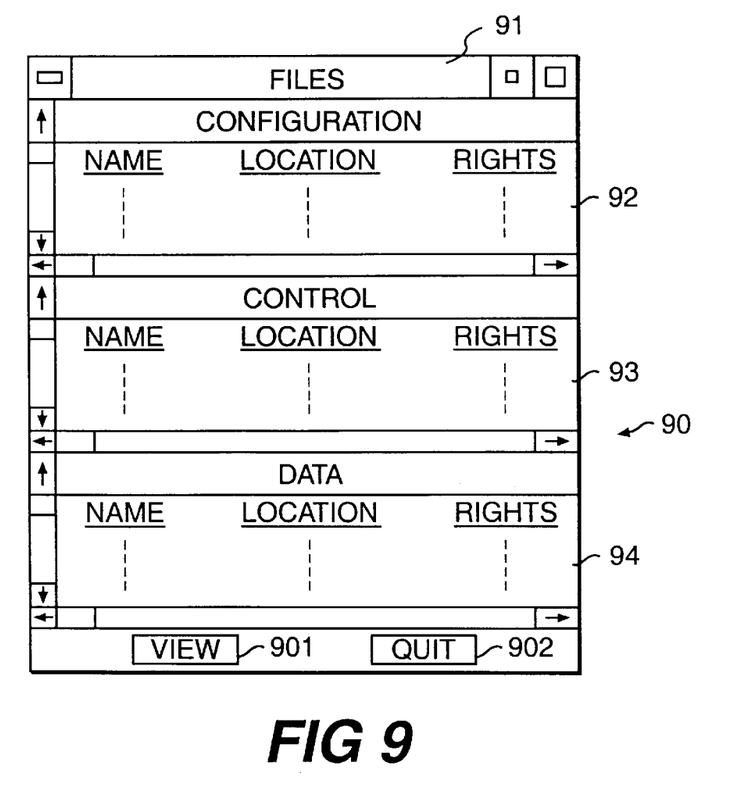
FIG. 9 illustrates a Files screen displaying information on the configuration files related to the instance.

The pane 90 includes a title bar 91, a first box 92 with horizontal and vertical scroll bars presenting information on the configuration files (configfiles) related to the instance, a second box 93 with horizontal and vertical scroll bars presenting information on the control files (controlfiles) related to the instance, a third box 94 with horizontal and vertical scroll bars presenting information on the data files (datafiles) related to the instance, a first control button 901 (VIEW) which makes it possible to access the contents of a text file, and a second control button 902 (QUIT) which makes it possible to leave the pane 90 by means of the mouse.

The information related to a file will be displayed, for example in the form of a line indicating the name (Name) of the file, the physical location (Location) of the file, the rights (Rights) attached to the file, the reference of the owner (Owner) of the file, the reference of the proprietary group (Group) to which the file belongs, the size (Size) of the file in octets, the time data (Month, Day, Time) corresponding to the last modification or the creation of the file, and for the data files, the logical name (Tsame) in the ORACLE domain.

A configuration file could be edited by positioning the mouse pointer over the line corresponding to this file and clicking twice on the left button of the mouse, or by selecting it (by clicking once on the left button of the mouse after positioning the pointer over the line) and selecting the "VIEW" button.

By selecting the Scripts folder 125, a pane 100 (illustrated in FIG. 10) is created in which the administrator has access to a set of scripts.

Figure 10:
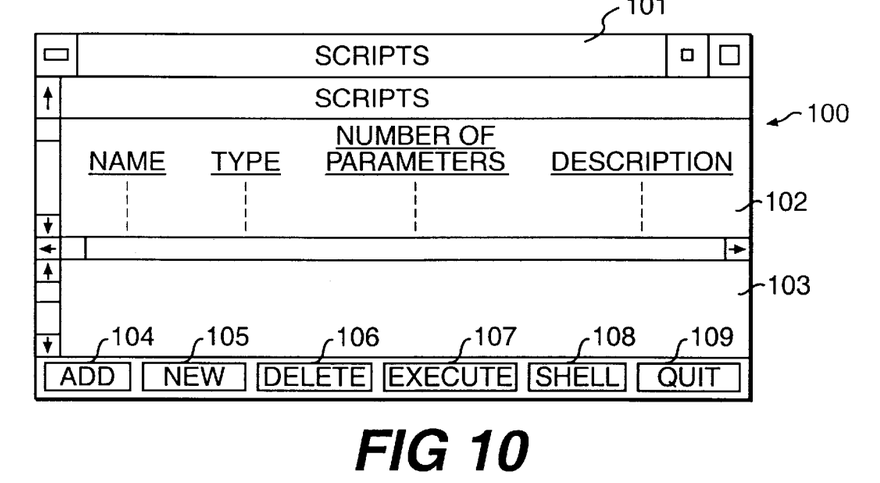
FIG. 10 illustrates a Scripts screen displaying information relating to the execution of a script.

The pane 100 includes a title bar 101, a first box 102 with horizontal and vertical scroll bars presenting information related to a list of scripts, a second box 103 with horizontal and vertical scroll bars presenting information related to the execution of a script, a first control button 104 (ADD) which makes it possible to add an existing script to the list of scripts, a second control button 105 (NEW) which makes it possible to create a new script, a third control button 106 (DELETE) which makes it possible to delete a script from the list of scripts, a fourth control button 107 (EXECUTE) which makes it possible to start the execution of a script, a fifth control button 108 (SHELL) which makes it possible to open an xterm session, and a sixth control button 109 (QUIT) which makes it possible to leave the pane 100.

Each script (or executable file) is described by a line which gives its name (Name) (this will be, for example, its access path or a name related to the current Oracle directory), its type (Type), that is the type of language (SHELL or SQL) to which it refers, which depends on the type of system referred to, the number of parameters (Nbpars) to be defined in order to allow its execution, and a possible description (Description) of the script.

By selecting the "ADD" button, a pane 110 (illustrated in FIG. 11) is created by means of which the administrator can add an existing script to the list of scripts managed by the interface.

Figure 11:
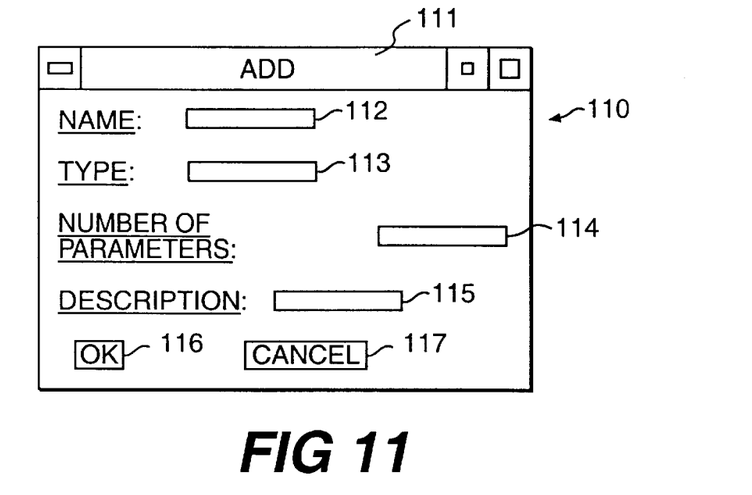
FIG. 11 illustrates an Add screen displaying information relating to adding an existing script to the managed list of scripts.

The pane 110 includes a title bar 111, a first field 112 which makes it possible to indicate in a text editing box the name of the script, a second field 113 which makes it possible to indicate in a text editing box the type of the script, a third field 114 which makes it possible to indicate in a text editing box the number of parameters to be defined in order to start the script, a fourth box 115 which makes it possible to indicate in a text editing box a possible description of the script, a first control button 116 (OK) which makes it possible to confirm, by selecting it with the aid of the mouse, the insertion of the script into the list, and a second control button 117 (CANCEL) which makes it possible, by selecting it with the aid of the mouse, to leave the pane 110 and to cancel the information appearing in it.

By selecting the "NEW" button, it is possible to create a script and add it to the list. An xterm session is opened and a vi session (a session which allows the display of a file to be viewed in a text editor under UNIX) is initiated. The user can then enter the text of the script. Once he has saved the file, a pane identical to that which appears in the case where a script is added is displayed in order to allow the insertion of the new script into the list managed by the interface.

By selecting the "DELETE" button, after having selected a script in the box 102 (for example by clicking once on the left button of the mouse when it is positioned over the line of the script), a pane 130 (illustrated in FIG. 12) is created in which the administrator can choose between the removal of the script from the list and the possible deletion of the script.

Figure 12:
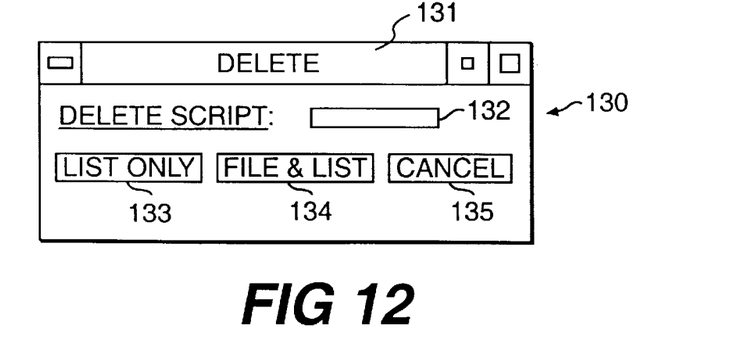
FIG. 12 illustrates a Delete screen displaying information relating to removal or deletion of an existing script from the managed list of scripts.

The pane 130 includes a title bar 131, a field 132 indicating the name of the script, a first control button 133 (LIST ONLY) which makes it possible to confirm, by selecting it, the removal of the script from the list of managed scripts (the file still exists), a second control button 134 (FILE AND LIST) which makes it possible to confirm, by selecting it, the deletion of the script itself and of its presence in the list of managed scripts, and a third control button 135 (CANCEL) which makes it possible, by selecting it, to leave the pane 130 and to cancel the operation in progress.

By selecting the "EXECUTE" button after having selected both a script in the box 102 (for example by clicking once on the left button of the mouse when it is positioned over the line of the script) and an instance in the box 15, a pane 140 (illustrated in FIG. 13) is created in which the administrator indicates the parameterization values necessary to the execution of the script, if the script requires the knowledge of parameters.

The pane 140 includes a title bar 141 and a certain number of fields corresponding to the number of parameters to be defined in order to allow the execution of the scripts. In the example illustrated in FIG. 13, the pane 140 includes five fields 142 through 146, each of which makes it possible to indicate in a text editing box the value of a parameter.

Figure 13:
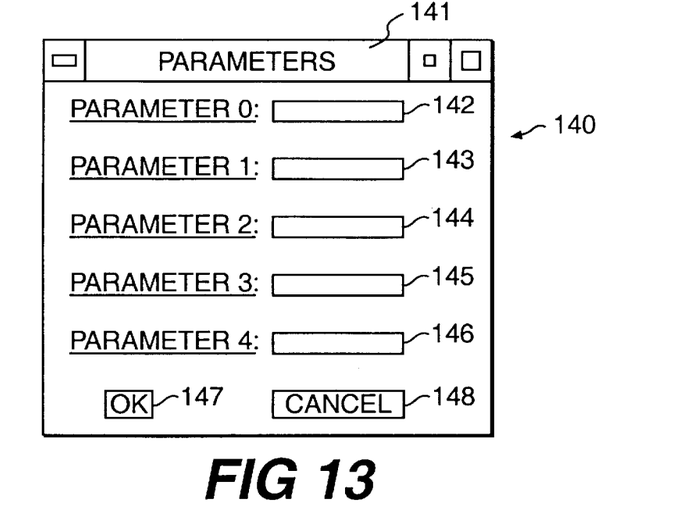
FIG. 13 illustrates a Parameters screen displaying parameter fields to be defined to allow execution of scripts.

The pane 140 also includes a first control button 147 (OK) which makes it possible, by selecting it, to validate the choice of the parameter values indicated and to start the execution (the pane 140 is then closed), and a second control button 148 (CANCEL) which makes it possible, by selecting it, to leave the pane 140 and to cancel the information appearing in it.

The box 103 allows the user to have access to the contents of the error and output files resulting from the execution of a script, which are displayed in this box.

By selecting the Errors folder 126, a pane 160 (illustrated in FIG. 14) is created in which the administrator has access to the available information in the base related to the error code.

Figure 14:
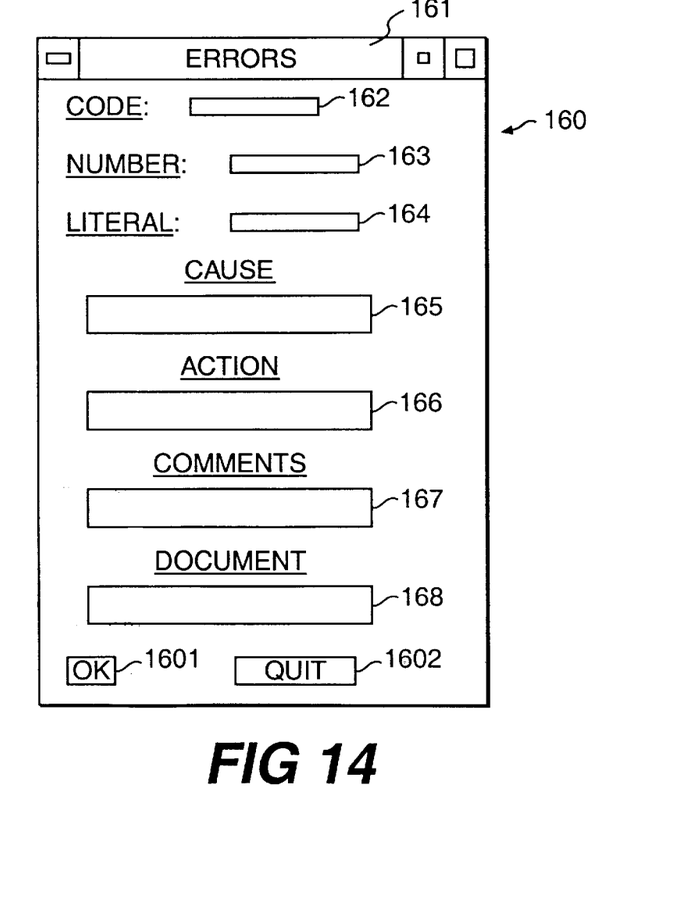
FIG. 14 illustrates an Error screen displaying information relating to error codes.

The pane 160 includes a title bar 161, a first field 162 indicating or making it possible to indicate in a text editing box the group identification code of an ORACLE error, a second field 163 indicating or making it possible to indicate in a text editing box the number of an Oracle error, a third field 164 indicating the text corresponding to the literal associated with an error, a fourth field 165 indicating the text corresponding to the cause associated with an error, a fifth field 166 indicating the text corresponding to the action to be taken in order to correct the error, a sixth field 167 indicating the text corresponding to the comments associated with an error, a seventh field 168 indicating the text corresponding to the document to be consulted regarding an error, a first control button 1601 (OK) which makes it possible to validate, by selecting it, a search for information related to an error once the group identification code and the number have been entered in the fields 162 and 163, and a second control button 1602 (QUIT) which makes it possible, by selecting it, to leave the pane 160.

The window 160 allows the user to determine the significance of an ORACLE error code. The interrogation is done by indicating the group of the error and its number in the fields 162 and 163. A literal, a cause, an action, comments and a document are received in return (with ORACLE, this information is supplied in a file in which they may be searched for, for example by means of a dichotomizing search).

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. An administrator interface which operates, by means of a graphical interface, with a relational data base management system including instances, said relational data base management system belonging to a distributed data processing environment, said distributed data processing environment comprising a plurality of machines connected to a network, said administrator interface comprising:

a) a plurality of folders which reflect the states of the network on the one hand and objects in said network on the other hand, said states and objects being at least relative to Management (120), Processes (121), said Processes (121) being in the course of running, Events (122) which affect said Processes (121), Configuration (123), Files (124), command scripts also known as Scripts (125), and Errors (126), which plurality of folders comprises a list of scripts and for each of said instances at least:

i) a list of instance references attached to nodes of the network, a list of process references, a list of event and trace file references, a list of parameters, and lists of file references, b) means for allowing access to and/or manipulation of the folders.

2. The interface according to claim 1 characterized in that the means for allowing access are constituted by a software program for the presentation and constitution of folders associated with a pointing device allowing the display of a main window (1) which makes possible selection by means of a menu bar (12) of one of the folders (120, 121, 122, 123, 124, 125, 126) so as to cause the appearance of a corresponding pane (50, 60, 70, 80, 90, 100, 140) as a result of the operation of the pointing device.

3. The interface according to claim 2, characterized in that, the window (1) includes a field (13) for indicating a name of a node, a field (14) for indicating a name of an instance, and a box (15) for indicating the state of the site and of objects of said site by means of icons (1521, 1522, 1523) representing nodes of the site, servers attached to said nodes and declared instances in said nodes.

4. The interface according to claim 3, characterized in that the selection of an icon (1521) representing a node of the site causes the creation of a pane (20) which includes a field (22) for indicating the name of the operating system used, a field (23) for indicating the name of the node, a field (24) for indicating the release of the operating system, a field (26) for indicating the network address of the machine corresponding to the node, and a control button (27) which makes possible closing the pane (20).

5. The interface according to claim 3, characterized in that the selection of an icon (1522) representing a server attached to a node causes creation of a pane (30) which includes a field (33) for indicating a startup date of the server, a field (34) for indicating a date of a last connection of the server to the network, a field (35) for indicating a number of connections accepted, a field (36) for indicating a number of connections rejected, a field (37) for indicating a number of active subprocesses of the server, a field (38) for indicating a length of a queue of requests submitted to said server, and a control button (39) which makes possible closing the pane (30).

6. The interface according to claim 3, characterized in that the selection of an icon (1523) representing a declared instance in a node causes creation of a pane (40) which includes a field (42) for indicating a reference of a release of the instance, a field (44) for indicating a size of system global area, a field (45) for indicating a reference of a file comprising a password for connecting to an instance from a remote site, a field (46) for indicating existence of roles related to a remote connection via the operating system, and a control button (47) which makes possible closing the pane (40).

7. The interface according to claim 2, characterized in that, the selection of the Management folder (120) causes the appearance of a pane (50) which includes a field (52) for indicating a node name, a field (53) for indicating an instance name, a field (54) for indicating an instance path, a field (55) for indicating a communication string, a field (56) for indicating an operating system administrator name, a field (57) for indicating a data base administrator name, a field (58) for indicating a password, a box (59) for selecting an instance, a control button (501) which makes possible validation of the addition of an instance in the box (59), a control button (502) which makes possible deletion of one of the instances from the box, a control button (503) which makes possible modification of values of fields related to one of the instances of the box, and a control button (504) which makes possible leaving the pane 50.

8. The interface according to claim 2, characterized in that, the selection of the Processes folder (121) causes the appearance of a pane (60) which includes a box (65) for presenting information on the processes related to a selected instance and a control button (601) which makes possible leaving the pane 60.

9. The interface according to claim 8, characterized in that the information on a process includes a name of the process, a name of a user to whom said process belongs, size of said process, and said process accumulated execution time.

10. The interface according to claim 2, characterized in that, the selection of the Events folder (122) causes the appearance of a pane (70) which includes a box (72) for presenting information on the most recent events related to a selected instance, a box (73) for presenting information on trace files related to the events, a control button (701) which allows the contents of files to be edited, and a control button (702) which makes possible leaving the pane (70).

11. The interface according to claim 10, characterized in that the information on an event includes application involved, time references of the event, name of the node involved, the name of the instance involved, and references of a trace file related to the event.

12. The interface according to claim 10, characterized in that the information related to a trace file includes a path of the file, rights related to the file, and a size of the file.

13. The interface according to claim 2, characterized in that, the selection of the Configuration folder (123) causes the appearance of a pane (80) which includes a box (82) for presenting a list of fields related to parameters of a selected instance, and a control button (83) which makes possible leaving the pane (80).

14. The interface according to claim 13, characterized in that the parameters include identification parameters, characteristic parameters, and parameters specific to operating systems or to the network.

15. The interface according to claim 2, characterized in that, the selection of the Files folder (124) causes the appearance of a pane (90) which includes a box (92) for presenting information on configuration files related to a selected instance, a box (93) for presenting information on control files related to the instance, a box (94) for presenting information on data files related to the instance, a control button (901) which makes it possible to access the contents of a text file, and a control button (902) which makes possible leaving the pane (90).

16. The interface according to claim 15, characterized in that the information related to a file includes a name of the file, physical location of the file, rights attached to the file, reference of an owner of the file, a size of the file, time data corresponding to last modification of the file or to creation of the file, and a logical name for data files in a domain of the data base.

17. The interface according to claim 2, characterized in that, the selection of a Scripts folder (125) causes appearance of a pane (100) which includes a box (102) for presenting information related to a list of scripts, a box (103) for presenting information related to execution of a script, a control button (104) which makes possible addition of an existing script to the list of scripts, a control button (105) which makes possible creation of a new script, a control button (106) which makes possible deletion of a script from the list of scripts, a control button (107) which makes possible starting execution of a script, and a control button (109) which makes possible leaving the pane (100).

18. The interface according to claim 17, characterized in that the information related to a script in the list of scripts includes a name of said script in the list, a type of said script in the list, and a number of parameters to be defined in order to allow execution of said script in the list.

19. The interface according to claim 17, characterized in that the selection of a control button which makes possible addition of an existing script to the list of scripts causes appearance of a pane (110) which includes a field (112) for indicating the name of the script, a field (113) for indicating the type of the script, a field (114) for indicating the number of parameters to be defined in order to start the script, a control button (116) which makes possible confirmation of insertion of the script into the list, and a control button (117) which makes possible leaving the pane (110) and to cancel the information appearing in the pane (110).

20. The interface according to claim 17, characterized in that the selection of the control button which makes possible deletion of a script form the list of scripts causes appearance of a pane (130) which includes a control button (133) which makes possible confirmation of removal of the script from the list of scripts, a control button (134) which makes possible confirmation of deletion of the script itself and of presence of said script in the list of scripts, and a control button (135) which makes possible leaving the pane (130) and canceling an operation in progress.

21. The interface according to claim 17, characterized in that the selection of the control button which makes possible execution of a script causes appearance of a pane (140) which includes one or more fields (142 through 146) for indicating a value of one or more parameters, a control button (147) which makes possible validation of a choice of parameter values indicated and starting of execution, and a control button (148) which makes possible leaving the pane (140) and canceling information appearing in said pane (140).

22. The interface according to claim 2, characterized in that, the selection of the Errors folder (126) causes the appearance of a pane (160) which includes one or more fields (162, 163) for indicating an error, and one or more fields (164, 165, 166, 167) for indicating information related to the data indicated in the first field or fields (162, 163).

* * * * *